United States Patent Office.

THOMAS HAWKS, OF ROCHESTER, NEW YORK.

Letters Patent No. 78,874, dated June 16, 1868.

IMPROVED COMPOSITION FOR THE MANUFACTURE OF BEER, ALE, PORTER, &c.

*The Schedule referred to in these Letters Patent and making part of the same.*

TO ALL WHOM IT MAY CONCERN:

Be it known that I, THOMAS HAWKS, of the city of Rochester, in the county of Monroe, and State of New York, have invented a new and improved Product or Composition of Matter for Making Beer, Porter, Ale, and other Malt Liquors, which I term Concentrated Wort; and I hereby declare that the following is a full and exact description of said composition of matter, and of the method of producing it.

The object of my invention is to reduce by the best method of evaporation the infusion of malt and hops, commonly called wort, to a state in which the condensed product is of much less bulk than the original ingredients, and is a portable and merchantable commodity, and to do this in such a manner as not only to cause no deterioration in the peculiar qualities of the ingredient articles, but to insure their preservation against the effects produced by time and incident to changes of climate and temperature.

The substance so produced is designed to be used for the ready and expeditious production of ale, beer, and other beverages, by the addition of water and yeast in suitable proportions, and subjecting to the proper temperature to produce fermentation.

I have devoted much time and expense in experiments to determine the best method of securing this result. I have tried different modes of evaporation, and have evaporated down to different degrees of consistency, from a thin liquid to nearly a solid state, and have practised various processes of making the evaporation.

I find evaporation *in vacuo* to be preferable to evaporation in the open air, for the following reasons:

First. The evaporation of the aqueous portion of the infusion by the latter process takes place so slowly that fermentation sets in, injuring very perceptibly the properties of the ingredients before desiccation is effected.

Second. If the temperature be increased to make the evaporation more rapid, the high heat, in combination with the oxygen of the atmosphere, decomposes a portion of the saccharine matter as the infusion becomes dense, changing it into caramel, an inert product, incapable of vinous fermentation, and hence depriving the beverage produced from it, in part, of the sprightly effect and effervescence of alcohol and carbonic acid, and imparting a bitter, disagreeable flavor, and also discoloring it.

I also find that evaporation to a thickness or consistency greater than a heavy sirup or molasses, or of about the weight of eleven pounds to the gallon, wine-measure, is impracticable, for the following among other reasons:

When the infusion has been considerably reduced by evaporation, and has become thick and heavy, or of about the consistency above specified, the particles do not separate sufficiently fast to allow the steam, and, in consequence, the heat to escape. This happens necessarily and inevitably without increasing the temperature specified in my description of process below. Consequently, even by the vacuum process, if evaporation be continued beyond the consistency herein stated, towards a more nearly solid state, the temperature of the mixture will be increased, and more or less of the saccharine matter will be burned, and thereby changed into a black, inert mass, incapable of passing properly through the vinous fermentation. From this, two noticeable results will follow: The beverage produced from the condensed substance will lack perceptibly the effervescent qualities which are essential to them, and will be more or less discolored. There is, moreover, great danger that in this attempt to reduce the mixture to a greater density than above specified, it will adhere to the heating surface, thereby producing, in a still greater degree, the injurious effects just described. This danger is so imminent that even under skillful management the adhesion would be likely to occur to some extent in a majority of instances. It would require also much more time to make the evaporation to a solid state, for the evaporation proceeds more slowly as the substance increases in density.

The difficulties of bringing the mixture to a solid state will be more apparent when it is considered that the saccharine matter in malt belongs to the class of grape-sugars, for which there is no known process of granulation, and that it requires the aqueous portion of it to be wholly expelled in order to bring it to a solid state.

For these reasons, viz., the inevitable destruction of some portion of the effervescing or beer-making qualities of the mixture, and the great risk of still further injury from adhesion and the loss of time, it is inexpedient for practical purposes to carry the evaporation beyond the thickness or consistency herein stated, and hence evaporation to about that degree of density, and not to a solid state, is an essential and the controlling feature of my invention.

My process consists substantially in the following treatment:

An infusion of malt is made by steeping with warm water (the temperature of which is 160° to 170° Fahrenheit, or thereabouts,) in a mash-tub of ordinary construction, which is drawn off, and fresh water is supplied repeatedly until the strength of the malt is fully extracted.

This liquor is then placed in a wooden tub, preferably lined with copper, and boiled with steam, or in a vessel of copper or of other suitable material, and boiled over a fire. During the boiling, common salt may be added, in the proportion of four or five pounds to fifty bushels of malt, and the liquor may be clarified with gelatine in the usual manner. After the liquor has been boiled from one to two hours, I mix with it hops in such proportion as may be demanded for the kind of malt liquor to be produced from the condensed extract; but ordinarily in the proportion of from one pound to one pound and a half of hops to each bushel of malt, that being the proportion used for ordinary beer or ale.

During the process of boiling, at the option of the operator, cane-sugar may advantageously be added, in proportion adapted to the alcoholic strength of the beverage for which the condensed product is intended, either as ordinary beer or ale, stock ale, porter, &c., say from two to three pounds of sugar to every bushel of malt.

The process of boiling should occupy, from first to last, from two to four hours, or until the liquor is thoroughly clarified, when the liquor is drawn off into a receiving-vessel, which is connected with a vacuum-pan by a pipe or other suitable means, and as the air is exhausted from the pan the liquor flows in to supply its place. It is then subjected, while *in vacuo*, to a temperature of 130° to 150° Fahrenheit, or thereabouts, for a sufficient length of time to condense it to a liquid of the consistency of a heavy molasses, or ordinarily of such consistency that from four to five gallons of it will produce a barrel of ordinary beer or ale. In this state it is suitable for drawing off into kegs or other vessels or packages for preservation and transportation, as a portable and merchantable commodity, requiring only the addition of the requisite amount of water and yeast to convert it into ale or other malt beverages. When required for use, dissolve this condensed substance in water, in the proportion, for ordinary beer or ale, of one part of the condensed substance to six or seven parts of water, apply yeast, and subject the liquid to the usual process of fermentation, keeping it at the temperature, and managing it in all respects as in the ordinary manufacture of such malt liquors. Instead of boiling the hops with the infusion of malt, they may be separately boiled, and then mixed with the infusion of malt after that has been boiled, and the mixture may then be condensed as before described.

The addition of cane-sugar is found to give an increased preservative quality and consequent durability to the preparation, and to add to the alcoholic properties of the beer with greater economy than could otherwise be done.

The gelatine aids in clarifying, and thus improving the beer or ale during the subsequent process of fermentation, and also assists the vinous fermentation. It is also found to aid essentially in shielding the concentrated compound from any fermentation while in that condition, thus aiding the cane-sugar in preserving the portable compound in an unchangeable state.

Ale and other beverages produced from the extract thus condensed possess a finer flavor and more lively effervescent qualities than when brewed in the ordinary manner, and this is explained by the fact that the malt, hops, and other vegetable substances are preserved in greater perfection by evaporating the water which they contain at so low a temperature that they are not decomposed by the action of heat, and air not being present during the process, the incipient fermentation is prevented from occurring, and thereby the saccharine and other fermentative properties remain unchanged in the condensed product.

I claim as a new product, the extract of malt and hops, or, as I term it, concentrated wort, prepared in suitable proportions for the manufacture of ale, beer, and other malt liquors or beverages, when condensed to a sirup or substance of thick consistency, substantially as herein described, either with or without the addition of gelatine, or with or without the addition of cane-sugar, substantially in the manner and for the purpose herein set forth.

In witness whereof, I have hereunto signed my name in the presence of two subscribing witnesses.

THOMAS HAWKS.

Witnesses:
 GEO. G. MUNGER,
 R. F. OSGOOD.